J. C. HORNUNG.
PRESSURE AND TEMPERATURE CONTROL VALVE.
APPLICATION FILED JULY 27, 1912.
1,091,660.
Patented Mar. 31, 1914.
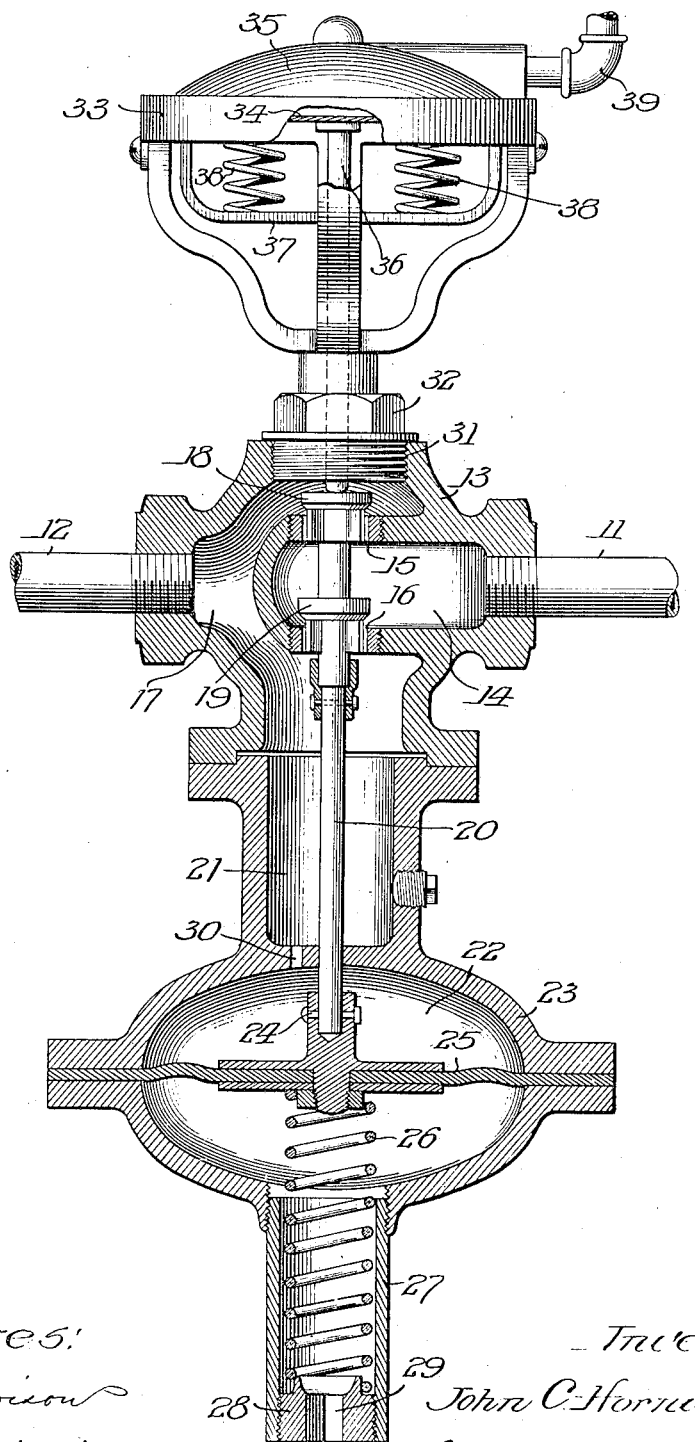

UNITED STATES PATENT OFFICE.

JOHN C. HORNUNG, OF CHICAGO, ILLINOIS.

PRESSURE AND TEMPERATURE CONTROL VALVE.

1,091,660.   Specification of Letters Patent.   Patented Mar. 31, 1914.

Application filed July 27, 1912. Serial No. 711,904.

*To all whom it may concern:*

Be it known that I, JOHN C. HORNUNG, a citizen of the United States, residing at Chicago, in the county of Cook and State of Illinois, have invented certain new and useful Improvements in Pressure and Temperature Control Valves, of which the following is a specification.

My invention relates to valves and more particularly to a combined pressure and temperature control valve adapted for use in connection with central station heating plants and the like, the invention having for its object the combination in a valve of means to maintain a constant given head of pressure in the house system irrespective of variations of pressure in the main, subject, however, to modifications of such house pressure in order to maintain a constant temperature in the apartment.

Pressure control valves are old and well known in this art as are also temperature control valves but the combination herein set forth whereby the pressure control valve is itself under the direct influence of a temperature control valve is believed to be new and has proven to be of great importance.

Having this primary object in view and others which will develop as the description proceeds the invention consists in the construction, arrangement and combination of parts hereinafter fully set forth in connection with and based upon the accompanying drawing wherein is illustrated in vertical section and partly in elevation a preferred embodiment of the invention.

In the drawing the reference numeral 11 designates a pipe leading from the main, not shown, and 12 designates a pipe leading to the house heating system, not shown. The heating fluid passing from one of these pipes to the other traverses the valve casing 13 entering first the valve chamber 14 and thence by way of the twin ports 15 and 16 to the valve chamber 17 which latter is in communication with the pipe 12. The ports 15 and 16 are controlled respectively by the two members 18 and 19 of a twin valve mounted upon the stem 20 which depends from said valve through the cylinder 21 into the upper space 22 of a diaphragm casing 23 where said stem is attached by means of a pin 24 to the upper face of a diaphragm 25 while the lower face of said diaphragm bears upon a coil spring 26 disposed within the housing 27 and adjustable as to tension by means of the nut 28 threaded within the lower portion of the housing 27 and capable of adjustment therein by means of an angular bore 29 arranged to coöperate with a suitable tool.

The operation of the pressure control valve above described is well known. The object of this valve is to maintain a constant head of pressure within the valve chamber 17 and the pipe 12, which pressure is less than that within the valve chamber 14 and pipe 11. By reason of the fact that the valve stem is attached to the upper face of the diaphragm 25 and by reason of the further fact that the upper space 22 within the diaphragm casing is in communication by the port 30 and the interior of the cylinder 21 with the valve chamber 17, while the lower face of the diaphragm is acted upon by the adjustable spring 26, the valve is balanced when the pressure within the valve chamber 17 is equal to the tension of the spring 26 and the valve is held closed by the weight of its parts. If the pressure within the valve chamber 17 drops below that for which the spring 26 is adjusted, the fluid pressure on the upper side of the diaphragm becomes less than the spring pressure on the lower side thereof and the preponderance of the spring pressure opens the valve permitting additional fluid to pass from the valve chamber 14 through the ports 15 and 16 to the chamber 17 to restore the normal pressure within the house system. If, however, weather conditions are such as to require a lower head of pressure within the house system to maintain a predetermined temperature within the apartment it is desirable that the pressure control valve be automatically influenced so as not to act in the normal manner. Having in view such conditions and with the object of controlling said valve by the temperature within the house, I provide in combination with the pressure control valve as described a temperature control valve acting directly upon and influencing the action of the pressure control valve.

The top of the valve casing 13 is tapped at 31 and has threaded therein a bushing 32. Upon this bushing 32 is mounted a diaphragm chamber 33 the diaphragm 34 of which has its upper face exposed to the space 35 within said casing while its lower face has attached thereto a plunger 36 guided within the yoke 37 and the bushing 32, the lower end of the plunger resting upon the upper face of the valve 18.

Springs 38, 38 supported by the yoke 37 bear upon the lower face of the diaphragm 34 while the space 35 above the diaphragm is in communication by means of the pipe 39 with a thermostatic motor valve, not shown, of any well known construction whereby in the usual manner a pressure fluid is admitted to or exhausted from the space 35 according as the temperature in the apartment rises above and falls below a predetermined degree.

The action of the temperature control valve upon the pressure control valve is as follows: If the temperature rises above that for which the thermostat is set pressure fluid will be admitted to the space 35 forcing the diaphragm 34 and its plunger 36 downward until its lower end bears upon the upper face of the valve 18 whereby the valves 18 and 19 will be held closed even though the pressure within the valve chamber 17 and the pipe 12 may have fallen sufficiently below the pressure for which the spring 26 is set as would normally open said valve. Thus the pressure control valve is itself positively controlled by the temperature control valve so that its normal operation is intermitted and the temperature within the apartment is maintained constant under a reduced head of pressure within the house system.

Obviously this combination of valve could be advantageously employed in connection with refrigerating systems as well as in heating systems, in either case variation of temperature within the apartment would control the operation of the pressure control valve.

While I have illustrated the invention as embodied in the combination of pressure control and temperature control valves of a particular form, the invention is not to be construed as limited to the particular forms of construction shown by way of illustration as various modifications may be employed which would come within the scope and essence of the invention as set forth in the claims.

I claim:

1. The combination of a valve for controlling the supply of heating fluid, said valve normally responsive to variations in the pressure of said fluid on the egress side of the valve, a plunger arranged in line with the valve and independent thereof, a spring normally holding the plunger out of operation, and a thermostatically controlled diaphragm bearing on said plunger whereby at a predetermined temperature to force the plunger upon the valve to hold the latter in closed position, substantially as described.

2. In a valve, a casing having a through-way, a valve controlling said through-way, a diaphragm chamber, a valve stem bearing upon one side of the diaphragm, and an adjustable spring bearing upon the opposite side thereof, in combination with and normally out of operative engagement with a plunger arranged in line with the valve, a spring normally holding the plunger out of operation, and a thermostatically controlled diaphragm bearing on said plunger whereby at a predetermined temperature to force the plunger against the valve to hold the latter inoperative, substantially as described.

JOHN C. HORNUNG.

Witnesses:
W. H. Schott,
Arthur F. Lindley.